(12) United States Patent
Worden (10) Patent No.: US 7,757,641 B1
(45) Date of Patent: Jul. 20, 2010

(54) ANIMAL HARNESS WITH OPERABLE/CLOSED POSITION HANDLE

(76) Inventor: Carla Vonn Worden, 29 Ruden Crescent, Toronto, Ontario (CA) M3A 3H4

(*) Notice: Subject to any disclaimer, the term of this patent is extended or adjusted under 35 U.S.C. 154(b) by 495 days.

(21) Appl. No.: 11/302,656

(22) Filed: Dec. 13, 2005

Related U.S. Application Data (60) Provisional application No. 60/635,868, filed on Dec. 14, 2004.

(51) Int. Cl.
*A01K 27/00* (2006.01)
(52) U.S. Cl. .................................. 119/856; 119/792
(58) Field of Classification Search ................. 119/856, 119/792, 793, 725
See application file for complete search history.

(56) References Cited

U.S. PATENT DOCUMENTS

| | | | |
|---|---|---|---|
| 4,530,309 A | 7/1985 | Collins | |
| 4,559,906 A | 12/1985 | Smith | |
| 4,715,618 A * | 12/1987 | Harris | 119/771 |
| 5,146,875 A * | 9/1992 | Bolt | 119/654 |
| 5,359,964 A | 11/1994 | Sporn | |
| 5,913,285 A | 6/1999 | Pritchard | |
| 6,101,979 A | 8/2000 | Wilson et al. | |
| 6,164,245 A | 12/2000 | Johnson | |
| 6,408,799 B1 | 6/2002 | Franck | |
| 6,450,130 B1 * | 9/2002 | Goldberg | 119/792 |
| 7,357,099 B2 * | 4/2008 | Smith et al. | 119/771 |
| 2004/0025804 A1 * | 2/2004 | Smith et al. | 119/792 |
| 2006/0112903 A1 * | 6/2006 | Zutis et al. | 119/792 |
| 2007/0034164 A1 * | 2/2007 | Sporn | 119/856 |
| 2008/0047501 A1 * | 2/2008 | Madere et al. | 119/863 |

* cited by examiner

*Primary Examiner*—Kimberly S Smith
(74) *Attorney, Agent, or Firm*—Jeffrey D. Myers; Samantha A. Updegraff; Peacock Myers, P.C.

(57) ABSTRACT

A harness for an animal, such as a dog, providing command and control of the animal in a manner which evenly distributes pressures across the animal's body to minimize strain and pressure on the animal's head, neck and spine, and which provides both a leash and a handle option for the operator which does not interfere with the animal's movements and is easily graspable. The animal harness has two straps extending around the animal, crossing in the chest area where a chest pad is located and crossing in the back area where a back pad is located. A collapsible handle is located to the rear of the back pad for manual grasping and a leash hook is located on the back pad for the attachment of a leash.

14 Claims, 12 Drawing Sheets

ANIMAL HARNESS WITH OPERABLE/CLOSED POSITION HANDLE

CROSS-REFERENCE TO RELATED APPLICATIONS

This application claims the benefit of the filing of U.S. Provisional Patent Application Ser. No. 60/635,868, entitled "Animal Harness," filed on Dec. 14, 2004, and the specification thereof is incorporated herein by reference.

BACKGROUND OF THE INVENTION

1. Field of the Invention (Technical Field)

The present invention relates to animal harnesses.

2. Background Art

For many years, the movements of domesticated animals, such as dogs, have been controlled through the use of an intermediary apparatus involving an item worn by the animal and a means by which the person interacts with the item. A common example of this is the collar and leash combination, whereby the animal wears a collar around its neck and a leash comprising of a length of rope or leather is attached to the collar. A person may impart control and commands to the animal by pulling on the leash to tug the collar. Unfortunately for the animal, such an apparatus causes chocking and strain to the animal's head, neck and spine.

In attempts to gain better control over the animal with less strain on the animal, harnesses have been designed. Use of a harness is preferred for animals that have suffered or are recovering from trauma, surgery or treatment affecting the head, neck or spine, as well as for providing increased control of and comfort for healthy animals. Generally, a harness comprises a body section and a neck section which are connected together. Although improved control over the animal is achieved, as compared to the collar and leash combination, conventional harnesses do not distribute pressures evenly across the body of the animal, which continues to result in undue strain and pressures on the animal's sensitive regions, such as under the legs and around the stomach. Other harnesses employ elaborate cinching and pulling mechanisms in an attempt to distribute pressures on the animal. However, these harnesses are complicated to manufacture and to use. Other harnesses do not contain handles or contain handles that are not easily graspable or interfere with the animal's movement. In such cases, it is difficult, if not impossible, to be close to the animal while controlling the animal. This is particularly important for working dogs, such as guide dogs, police dogs and customs dogs.

In the Sporn U.S. Pat. No. 5,359,964, a harness is described which attempts to control a dog by having straps ride up the dog's crotch when the dog strains against the leash. While focusing pressure on this highly sensitive area may be effective in causing submission in the animal, it achieves this result by inflicting pain and discomfort on the animal.

In Pritchard U.S. Pat. No. 5,913,285 and Wilson U.S. Pat. No. 6,101,979, harnesses are described which attempt to distribute pressure by providing for a chest pad. While these harnesses distribute pressure across the animal's chest, they do not pull evenly across the body to evenly distribute the pressures.

In Collins U.S. Pat. No. 4,530,309 and Smith U.S. Pat. No. 4,559,906, harnesses are described which contain a handle for grasping by an operator. However, these handles are rigid and would interfere with the animal's movements in confined spaces. In Johnson U.S. Pat. No. 6,164,245, a harness is described that contains a handle that lies against the back of the animal. This type of handle is difficult to readily grasp while the animal is moving and does not allow for pressures to be evenly distributed across the harness when in use. In Franck U.S. Pat. No. 6,408,799, a harness is described that contains a handle that may be fixed in either an upright or a flat position, depending on the particular needs at the time. However, this involves complicated mechanical means which are costly to manufacture, difficult to incorporate into the harness, requires a rigid harness and greatly increases the weight of the harness. Additionally, such a harness cannot be easily used with a leash.

There is therefore a need for an improved animal harness which distributes pressures evenly across the harness without imposing pressures on the animal's head, neck and spine and without imposing pressures on the animal's other sensitive areas, while also providing for both a leash and a handle interaction by the operator whereby the handle option does not interfere with the animal's movement while being easily graspable by the operator and which is easy to manufacture and use.

BRIEF SUMMARY OF THE INVENTION

The present invention discloses an animal harness that provides command and control of an animal, such as a dog, in a manner which minimizes strain and pressure on the animal's head, neck and spine.

The present invention also discloses an animal harness that provides both a leash and a handle option for the operator which does not interfere with the animal's movements and is easily graspable, thereby providing increased comfort and confidence for the operator, including minimizing hyper-extension of the arm of the operator and minimizing the stress often encountered by operators who fear a lack of control over the animal.

The present invention also discloses an animal harness which may be made from light weight, waterproof and abrasion resistant materials, environmentally friendly non-toxic foam padding with memory for custom fitting, strong and durable clasps for long life which are easy to engage and disengage thus simplifying the fitting of the animal with the harness, reflective piping and patches which protect the animal and the operator at night and which is machine washable to reduce the growth of bacteria.

While the present invention is suited for many different uses, it may be employed in veterinary uses and it may also be used for training young animals and training working specialty animals, such as guide, police, military, security and customs dogs, or for comfortably controlling aging or disabled animals. The present invention may also be used by owners who require maximum control over their animals in crowds or who wish to fashionably accessorize their animal.

BRIEF DESCRIPTION OF THE DRAWINGS

The accompanying drawings, which are incorporated into and form part of the specification, illustrate one or more embodiments of the present invention and, together with the description, serve to explain the principles of the invention. The drawings are only for the purpose of illustrating one or more preferred embodiments of the invention and are not to be construed as limiting the invention. In the figures.

DETAILED DESCRIPTION OF THE INVENTION

Animals, such as dogs, play many roles in people's lives, including providing security and companionship as pets, providing functionality as guide dogs and acting as important tools for police, military and customs officials. In these roles, it is important for the operator to be able to control the animal without exerting undue stress on the animal's head, neck or spine, as such stress causes damage and discomfort to the animal and results in unpredictable responses from the animal.

When animals undergo veterinary treatment of the head, neck or spine, the recovery from such treatment often requires the absence of undue stress on these areas in order to facilitate rapid and complete healing and avoid the infliction of pain or discomfort to the animal. However, the animal's operator still requires a means of controlling the animal during its recovery period.

Improved control over the animal's movements without the infliction of stress on the animal's head, neck or spine provides the operator with improved confidence, thereby facilitating improved use of the animal.

The present invention discloses an animal harness which provides for improved control over the animal's movements without exerting undue stress on the animal's head, neck or spine.

Figure 1:
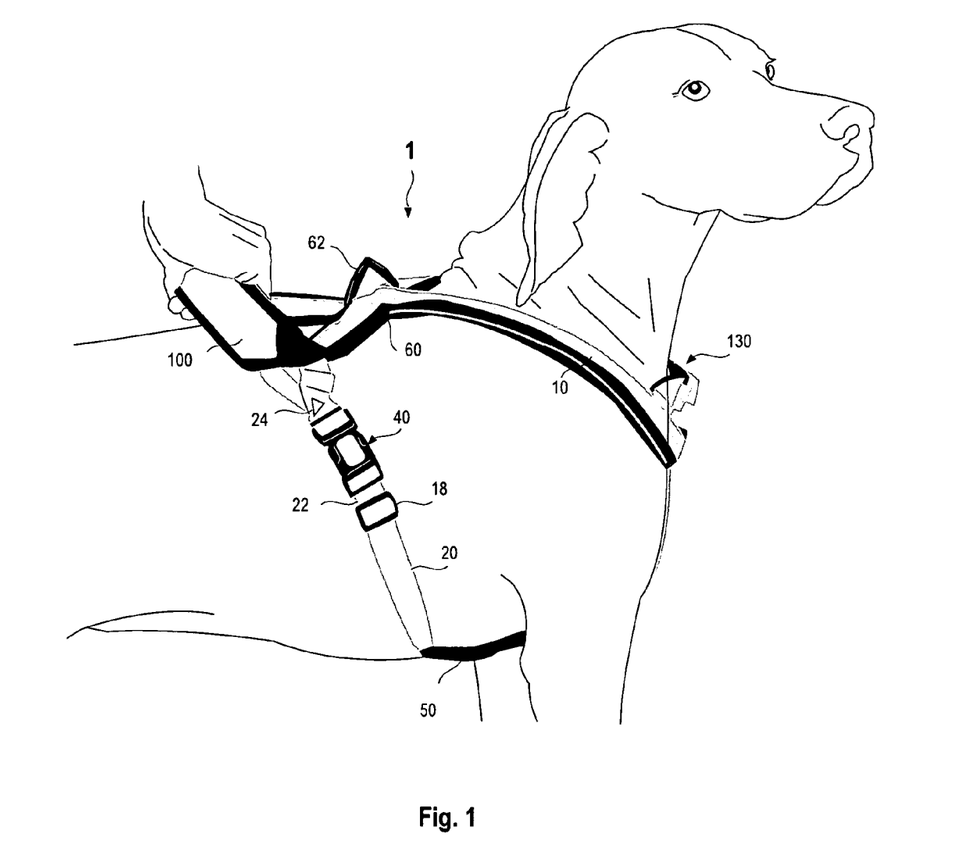
FIG. 1 is a side view of the animal harness on a dog with a person grasping the handle in the operable position.
Figure 2:
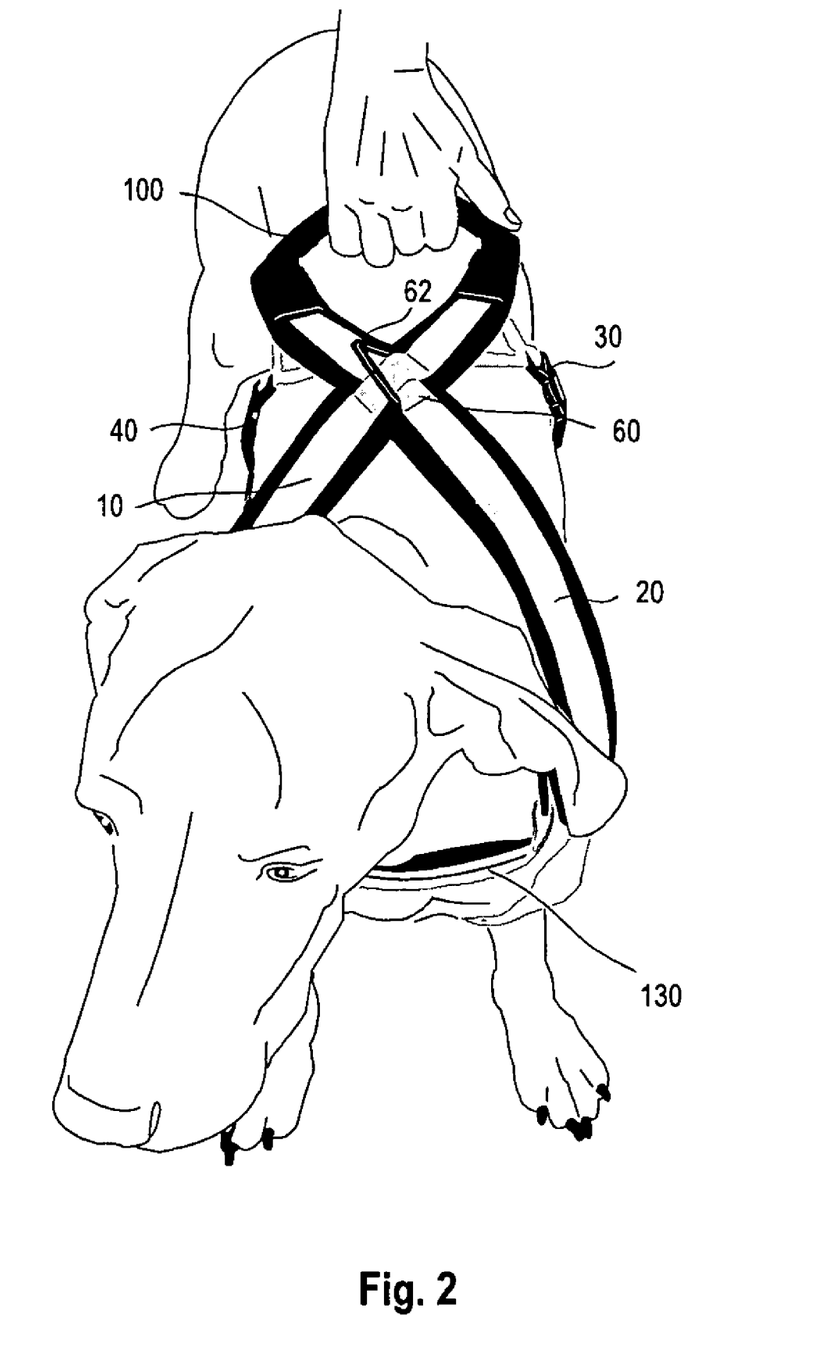
FIG. 2 is a top view of the animal harness on a dog with a person grasping the handle in the operable position.
Figure 3:
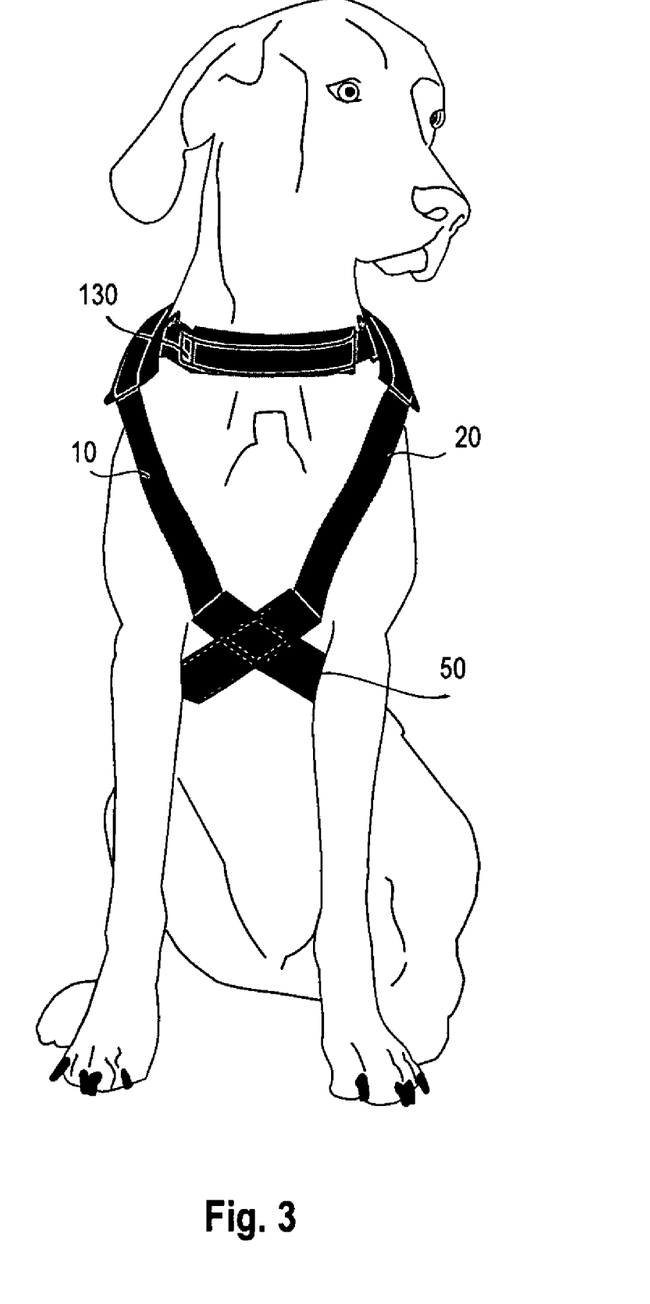
FIG. 3 is a front view of the animal harness on a dog.
Figure 4:
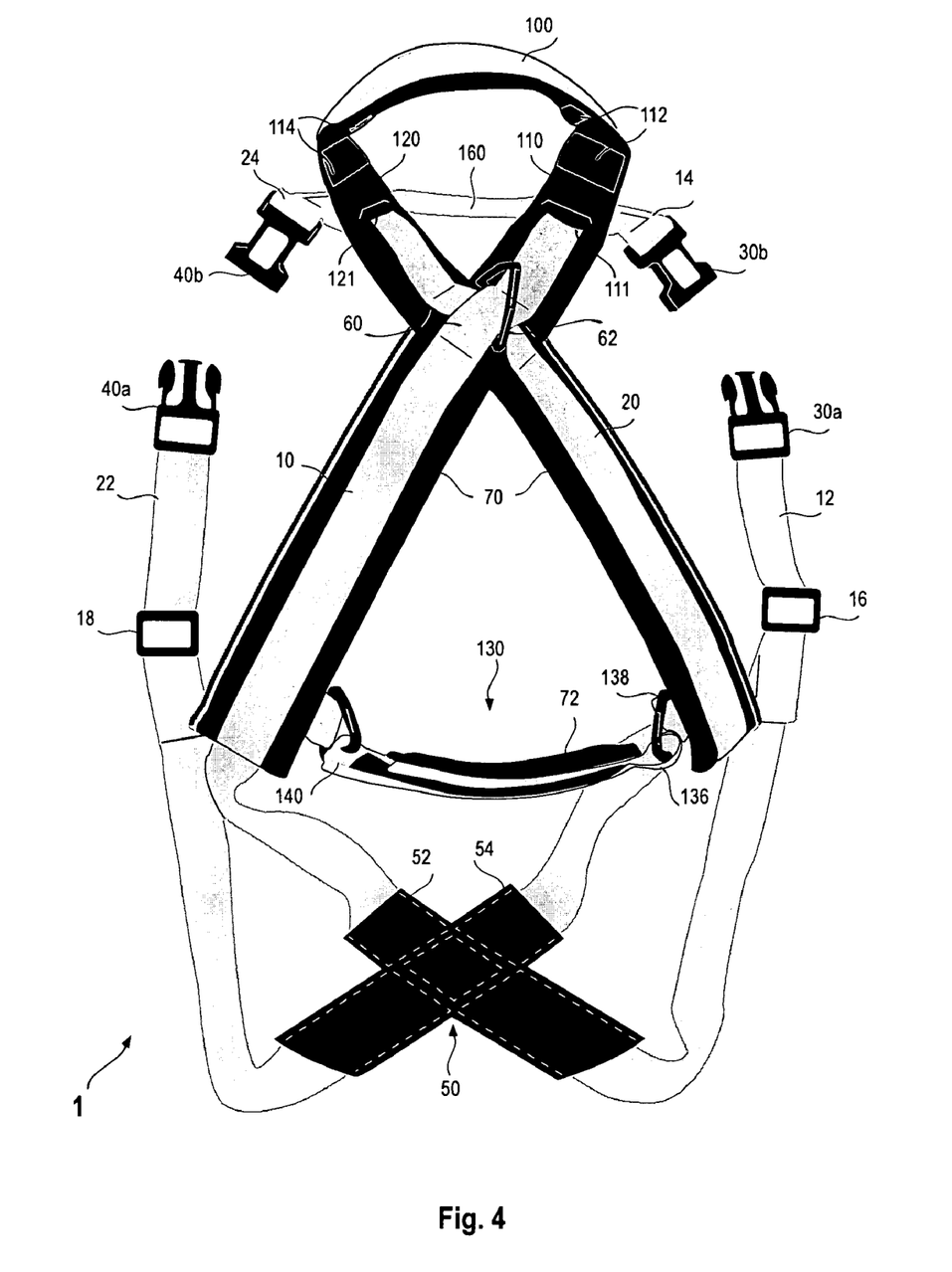
FIG. 4 is a perspective view of the animal harness in accordance with the present invention.

With reference to FIG. 4, in the preferred embodiment, an animal harness (1) has a first strap (10) with a first end (12) and a second end (14). A second strap (20) has a first end (22) and a second end (24). The first strap (10) and the second strap (20) can be made from flexible light-weight material, such as polypropylene and nylon webbing. The first strap (10) is located over the animal's right shoulder, crosses in front of the animal's chest under the animal's left leg and up the left side of the animal where the first end (12) and second end (14) of the first strap (10) releasably connect by means of a first operable clasp (30). The second strap (20) is located over the animal's left shoulder, crosses in front of the animal's chest under the animal's right leg and up the right side of the animal where the first end (22) and second end (24) of the second strap (20) releasably connect by means of a second operable clasp (40). The first operable clasp (30) and the second operable clasp (40) can be any means used to releasably connect two ends of a strap, for example a releasable clasp or buckle having a male end (30a, 40a) and a female end (30b, 40b).

The length of the first strap (10) and second strap (20) may be adjusted by standard loop means (16 and 18). Padding (70), such as non-toxic foam with memory, may be affixed by securing means, such as sewing, to the bottom of the portions of the first strap (10) and second strap (20) located over the shoulder and back areas of the animal. The first strap (10) and second strap (20) may be fitted with reflective material, such as thread or tape, to aid in illumination in dark settings.

Figure 11:
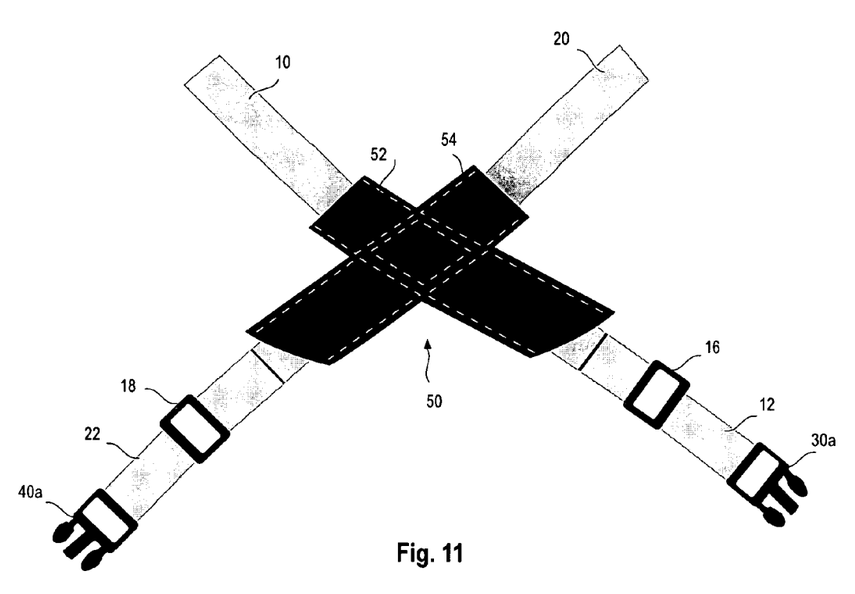
FIG. 11 separately shows the chest pad.
Figure 12:
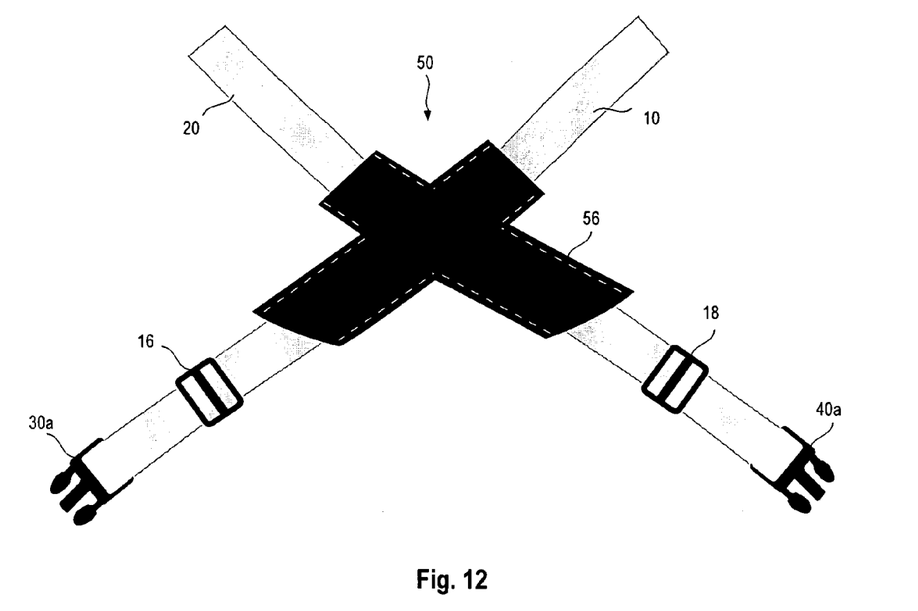
FIG. 12 separately shows the back of the chest pad.

The first strap (10) crosses the second strap (20) at the chest area of the thorax of the animal at which crossing area a chest pad (50) slidably connects the first strap (10) and the second strap (20). As shown in FIG. 11 and FIG. 12, the chest pad (50) comprises a first top strap piece (52), a second top strap piece (54), a first bottom strap piece (53), and a second bottom strap piece (55). The combined widths of the first strap pieces is greater than the width of the first strap (10) and the combined widths of the second strap pieces is greater than the width of the second strap (20). The chest pad (50) also has a bottom pad (56). The bottom pad (56) is a soft fabric, such as fleece, and is generally "X" shaped, consistent with the shape of the area created by the crossing of the first strap (10) and the second strap (20). The first top strap piece (52) and the first bottom strap piece (53) are affixed together by secure means, such as sewing, along the portions of their longitudinal edges where the first strap (10) and the second strap (20) do not cross. The second top strap piece (54) and the second bottom strap piece (55) are affixed together by secure means, such as sewing, along the portions of their longitudinal edges where the first strap (10) and the second strap (20) do not cross. In this way, the first top strap piece (52) and first bottom strap piece (53) create a channel through which the first strap may freely pass and the second top strap piece (54) and the second bottom strap piece (55) create a channel through which the second strap (20) may freely pass. The first top strap piece (52) and the second top strap piece (54) are affixed together by secure means, such as sewing, around the border of the area where they cross and the first bottom strap piece (53) and the second bottom strap piece (55) are affixed together by secure means, such as sewing, around the border of the area where they cross. The bottom pad (56) is affixed to the first bottom strap piece (53) and the second bottom strap piece (55) by secure means, such as sewing. In this way, the first strap (10) and the second strap (20) to slide freely within the chest pad (50).

As shown in FIG. 4, the first strap (10) and the second strap (20) are connected to the padding (70) by secure means, such as sewing, at the point near the animal's back where they cross to create a back pad (60) which is generally "X" shaped. A leash hook (62) is securely affixed to the top side of the back pad (60).

As shown in FIGS. 4, 5, 6 and 7, the padding (70) creates a handle (100) which is securely affixed between the first strap (10) and the second strap (20). The handle (100) has a first handle end (110) and a second handle end (120). The first strap (10) slides through an aperture (111) in the padding (70) at a point between the back pad (60) and the first handle end (110). The second strap (20) slides through an aperture (121) in the padding (70) at a point between the back pad (60) and the second handle end (120). The handle (100) is semi-rigid and has companion connectors (112 and 114), such as Velcro® or dome snaps, at each end of the handle (100) so that the handle (100) may be quickly and easily moved from a closed position to an operable position.

Figure 9:
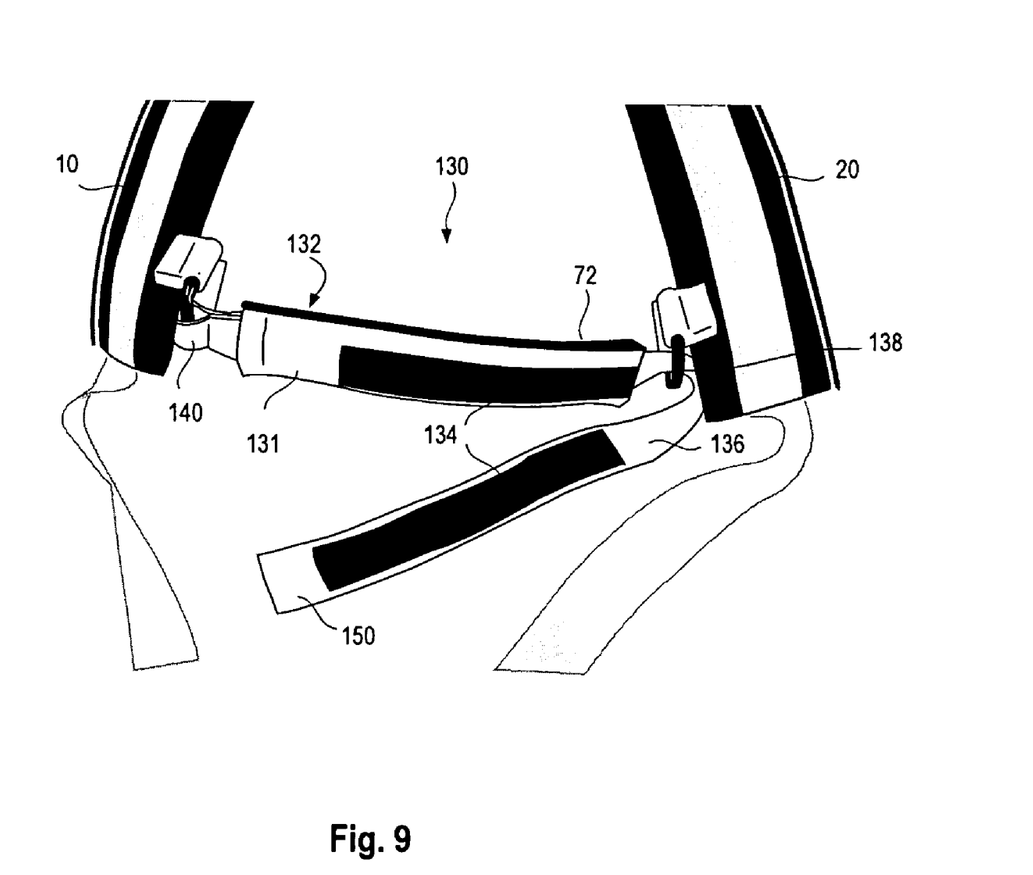
FIG. 9 separately shows the throat pad strap with the second end adjustably secured to the second strap.
Figure 9A:
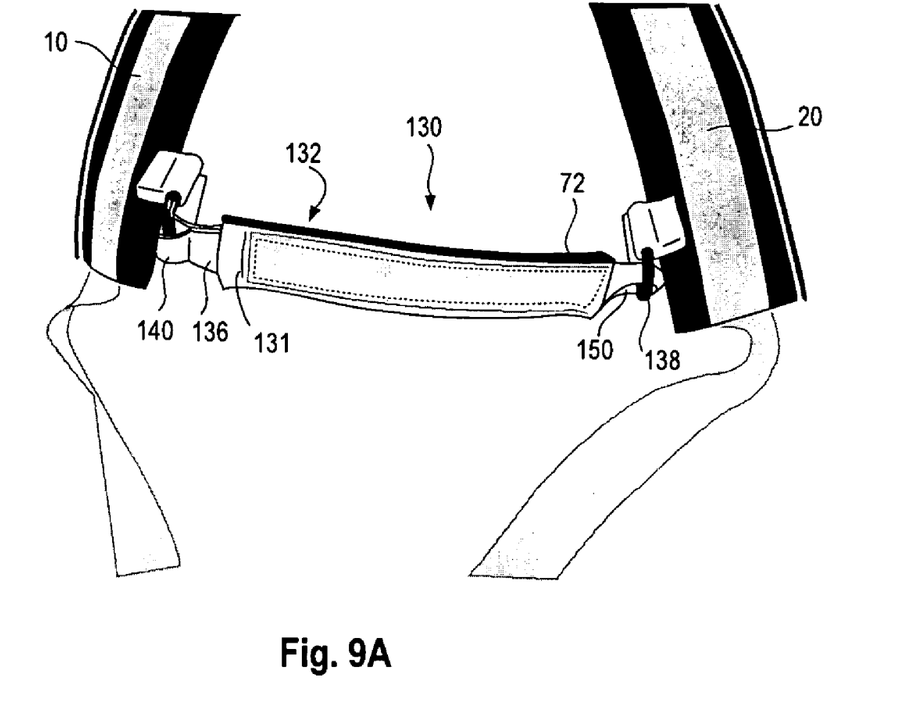
FIG. 9A separately shows the throat pad strap with the second end fixedly secured to the second strap.

With reference to FIG. 4 and FIG. 9, a throat pad (130) is located between the first strap (10) and the second strap (20)

at points between the chest pad (50) and the back pad (60). The throat pad (130) has a top throat pad piece (131) and a bottom throat pad piece (132) which are affixed together by secure means, such as sewing, along their longitudinal edges to from a channel through which a throat pad strap (136) may freely slide. Padding (72), such as foam with memory, is affixed by securing means, such as sewing, to the bottom throat pad piece (132). The throat pad strap (136) has a first throat pad strap end (140) and a second throat pad strap end (150), whereby the first throat pad strap end (140) is connected by securing means to the first strap (10) between the chest pad (50) and the back pad (60) and the second throat pad strap end (150) is releasably connected to the second strap (20) between the chest pad (50) and the back pad (60) by passing through a loop means (138) securely affixed to the second strap (20) to permit the length of the throat pad strap (136) to be adjusted. In this configuration, the length of the throat pad strap (136) may be adjusted to fit the animal by way of companion connectors (134), such as Velcro® or dome snaps, or by way of belt or loop connectors. Alternatively, as shown in FIG. 9A, the throat pad strap (136) has the first throat pad strap end (140) connected by securing means to the first strap (10) between the chest pad (50) and the back pad (60) and the second throat pad strap end (150) of the throat pad strap (136) is connected by securing means to the second strap (20) between the chest pad (50) and the back pad (60).

Figure 13:
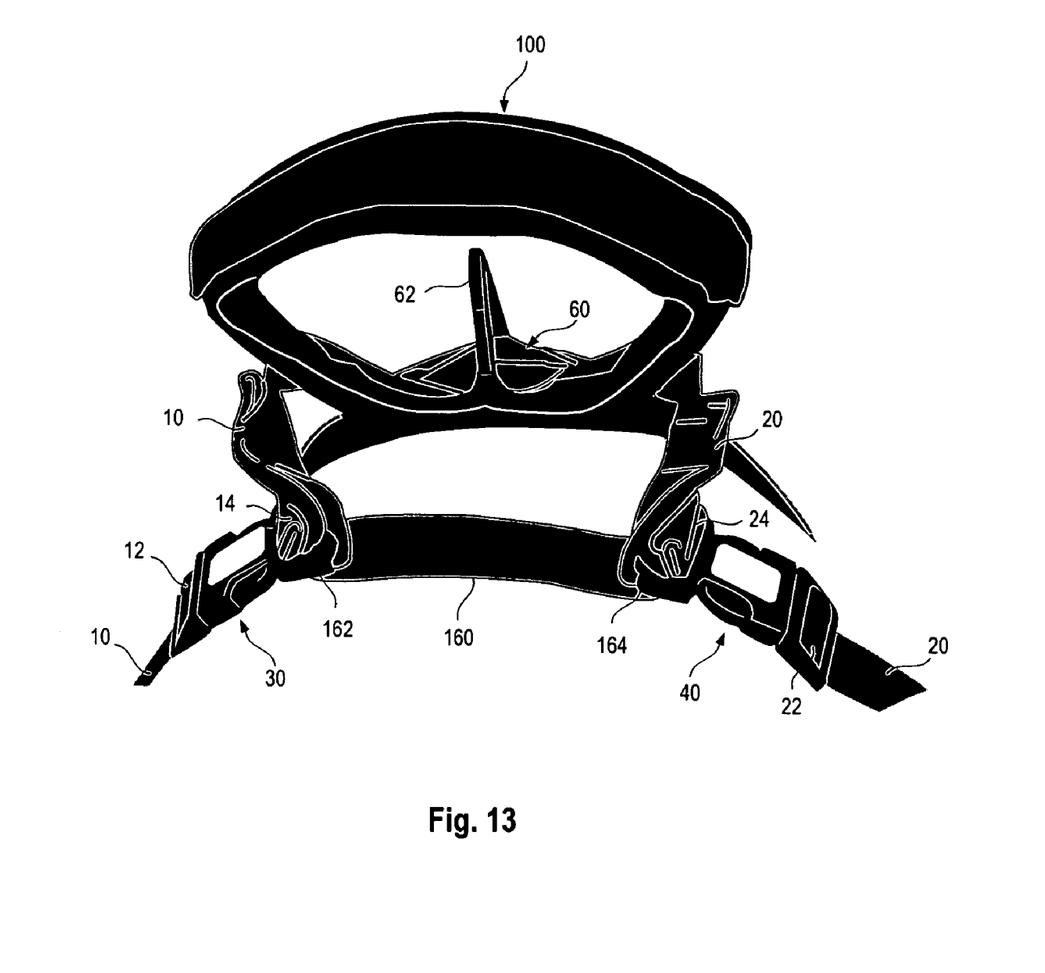
FIG. 13 separately shows a rear view of the handle and the back strap.

As shown in FIG. 13, a back strap (160) has a first back strap end (162) and a second back strap end (164). The first back strap end (162) is securably affixed to the first strap (10) at the second end (14) of the first strap (10). The second back strap end (164) is securably affixed to the second strap (20) at the second end (24) of the second strap (20). The back strap (160) helps raise the handle (100) off the animal's back to aid in grasping the handle (100).

As shown in FIGS. 1, 2, 3 and 10, the animal harness (1) is fitted onto an animal by placing the back pad (60) on the animal's back with the operable clasps (30 and 40) in the open position and the throat pad strap (130) in the open position and placing the animal's head through the opening between the back pad (60) and the chest pad (50). The first ends (12 and 22) of the straps (10 and 20) are passed underneath the animal's front legs and connected with the respective second ends (14 and 24) using the operable clasps (30 and 40) on either side of the animal. The length of the straps (10 and 20) is adjusted to fit the animal harness (1) securely on the animal using the standard loop means (16, 18). The throat pad strap (136) is adjusted using the companion connectors (134) to loosely fit the throat pad (130) at the base of the animal's throat. A leash (64) may be fixed to the leash hook (62).

Figure 5:
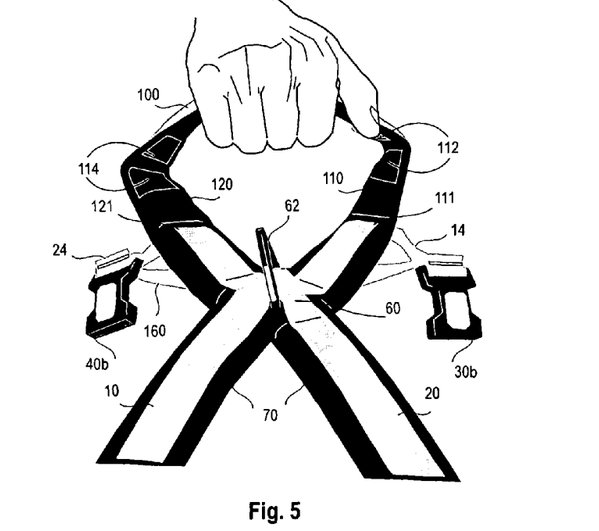
FIG. 5 separately shows the back pad and handle portions of the animal harness with a person grasping the handle in the operable position.
Figure 6:
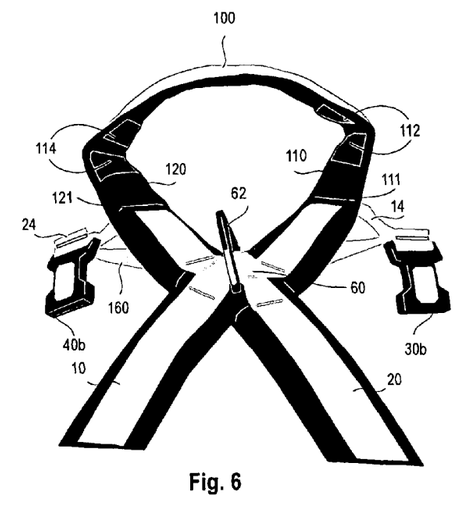
FIG. 6 separately shows the back pad and handle of the animal harness with the handle in the operable position.
Figure 7:
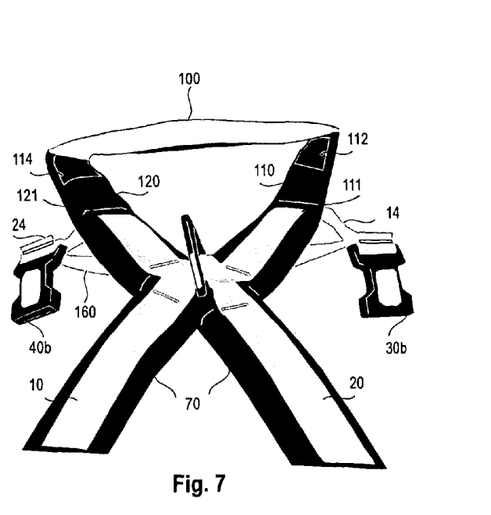
FIG. 7 separately shows the back pad and handle of the animal harness with the handle in the closed position.
Figure 8:
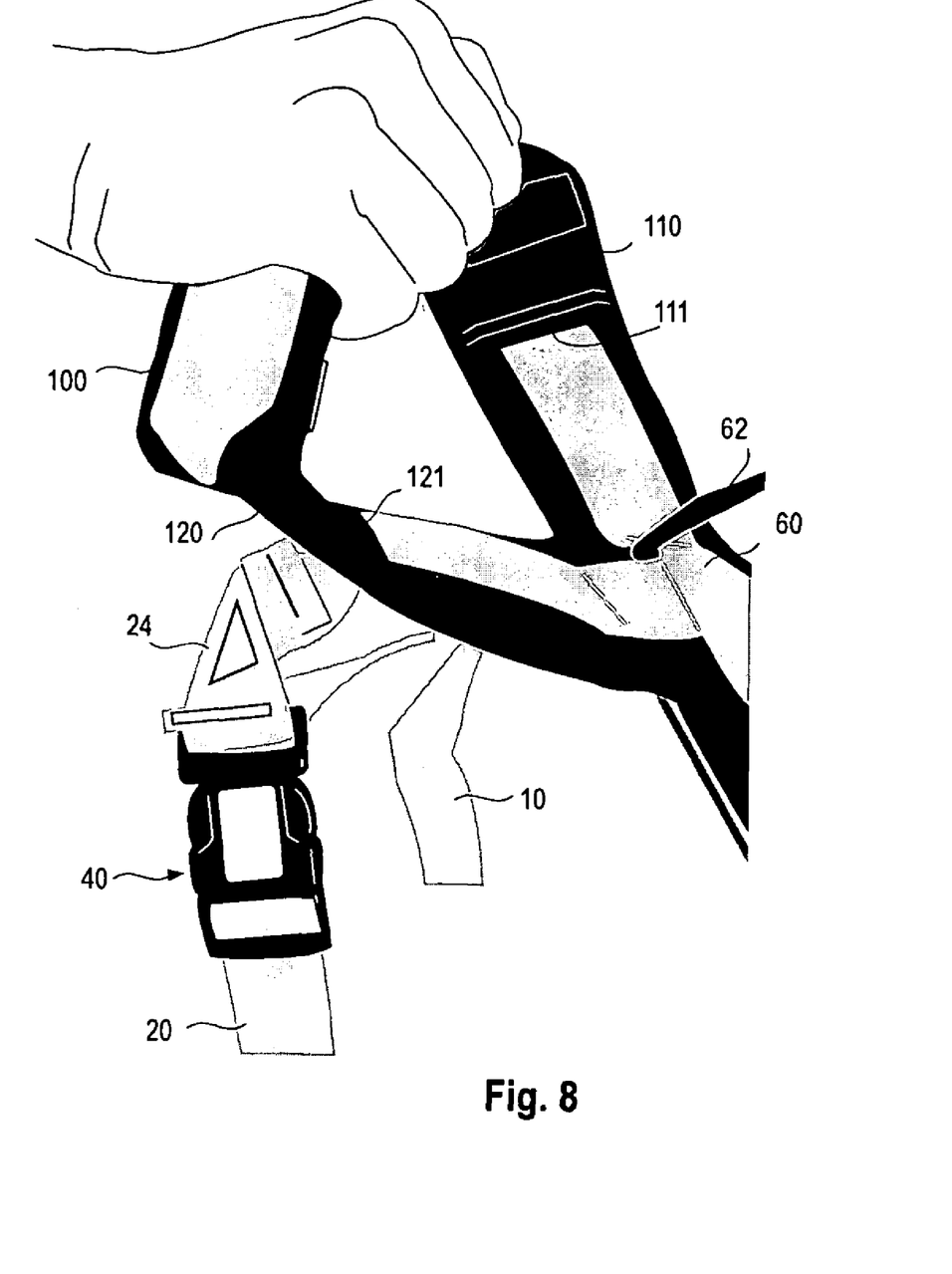
FIG. 8 separately shows a side view of the handle and an operable clasp connecting the first and second ends of a strap with a person grasping the handle in the operable position.

An animal may be controlled by engaging the handle (100) into an operable position, as shown in FIG. 6, from a closed position, as shown in FIG. 7, by releasing the companion connectors (112 and 114) and grasping the handle (100), as shown in FIG. 5 and FIG. 8. In this way, the handle (100) is accessible allowing the operator to hold the animal harness (1) and thus the animal in a desired manner, while positioning the operator into close proximity to the animal. This allows for increased control over the animal and increased response times to signals from the operator. Additionally, when the operator interacts with the animal harness (1), the position of the handle (100) between the back pad (60) and the operable clasps (30 and 40) causes the stresses resulting from such interaction to be distributed across the animal's body without putting strain on the head, neck or spine.

Figure 10:
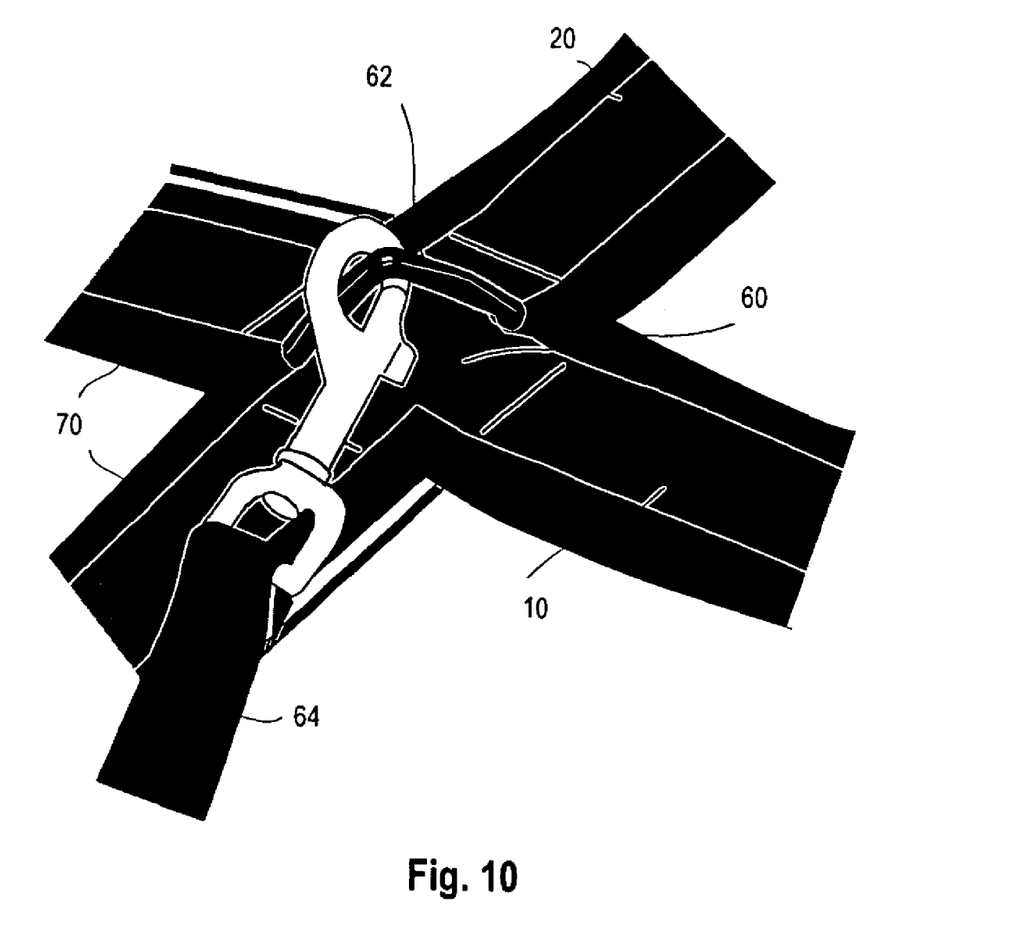
FIG. 10 separately shows the back pad and leash hook with a leash attached.

As shown in FIG. 10, an animal may also be controlled by engaging a leash (64) attached to the leash hook (62). This allows the operator to remain at a desired distance from the animal while maintaining control over the animal. Additionally, when the operator interacts with the animal harness (1), the position of the leash hook (62) on the back pad (60) causes the stresses resulting from such interaction to be distributed across the animal's body without putting strain on the head, neck or spine.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

I claim:

1. An animal harness comprising:
   first and second straps for extending around the body of an animal, said straps crossing at the chest of the animal and crossing at the back of the animal;
   a chest pad disposed where said straps cross the chest of the animal and said straps are slidably located through said chest pad;
   a padded back pad disposed where said straps cross the back of the animal and said straps are fixed; and
   a semi-rigid handle disposed between operable clasps and said back pad, said handle comprising at least one set of companion connectors to move said handle between an operable position and a closed position;
   wherein said first and second straps each have first and second ends, said first and second ends having companion connectors and wherein said handle is disposed between said straps proximate to the rear of said back pad.

2. The animal harness of claim 1, wherein each of said straps comprises a length adjuster.

3. The animal harness of claim 1, wherein at least one of said first and second straps is disposed adjacent to padding fixedly secured to its surface.

4. The animal harness of claim 1, wherein at least one leash hook is fixedly secured to said back pad.

5. The animal harness of claim 1, wherein a throat strap is fixedly connected to one of said first and second straps between said chest pad and said back pad and releasably connected to the other of said first and second straps between said chest pad and said back pad.

6. The animal harness of claim 5, wherein said throat strap is slidably located through a throat pad.

7. The animal harness of claim 1, further comprising a back strap, wherein said back strap is fixedly connected to each of said first and second straps at said second ends proximate said handle.

8. The animal harness comprising:
   a first strap having first and second ends, said ends having companion connectors;
   a second strap having first and second ends, said ends having companion connectors;
   a chest pad wherein said first and second straps cross and through which said first and second straps are slidably located;
   a padded back pad disposed where said straps cross the back of the animal and said straps are fixed; and
   a semi-rigid handle disposed between operable clasps and said back pad, said handle comprising at least one set of companion connectors to move said handle between an operable position and a closed position;
   wherein said first and second straps extend over the animal's back and each of the animal's shoulders and cross the animal's chest and extend under the animal's leg opposite each respective shoulder and extend up the animal's side opposite each respective shoulder, wherein said first ends of said first and second straps releasably connect with the respective second ends of said first and second straps by said companion connectors.

9. The animal harness of claim 8, wherein at least one leash hook is fixedly secured to said back pad.

10. The animal harness of claim 9, wherein each of said straps comprises a length adjuster.

11. The animal harness of claim 10, wherein at least one of said first and second straps has padding fixedly secured to its surface.

12. The animal harness of claim 8, wherein a throat strap is fixedly connected to one of said first and second straps between said chest pad and said back pad and releasably connected to the other of said first and second straps between said chest pad and said back pad.

13. The animal harness of claim 12, wherein said throat strap is slidably located through a throat pad.

14. The animal harness of claim 13, further comprising a back strap, wherein said back strap is fixedly connected to each of said first and second straps at said second ends proximate said handle.

* * * * *